(12) United States Patent
Redfield

(10) Patent No.: US 9,788,391 B1
(45) Date of Patent: Oct. 10, 2017

(54) SOLID STATE LIGHTING PANEL

(71) Applicant: Heartland, Inc., Minneapolis, MN (US)

(72) Inventor: Blake D. Redfield, Sauk Rapids, MN (US)

(73) Assignee: Heartland, Inc., Minneapolis, MN (US)

( * ) Notice: Subject to any disclaimer, the term of this patent is extended or adjusted under 35 U.S.C. 154(b) by 0 days.

(21) Appl. No.: 15/369,872

(22) Filed: Dec. 5, 2016

Related U.S. Application Data

(60) Provisional application No. 62/387,967, filed on Jan. 11, 2016, provisional application No. 62/386,494, filed on Dec. 3, 2015.

(51) Int. Cl.
| | | |
|---|---|---|
| *H05B 33/00* | (2006.01) | |
| *H05B 33/08* | (2006.01) | |
| *H03K 17/94* | (2006.01) | |

(52) U.S. Cl.
CPC ......... *H05B 33/089* (2013.01); *H03K 17/941* (2013.01); *H05B 33/0821* (2013.01); *H05B 33/0845* (2013.01)

(58) Field of Classification Search
CPC ........ H02J 13/0089; H02J 3/14; H02J 3/1892; H02J 7/0024; H02P 1/28; H02P 23/26; H02P 27/02; H02P 3/12; H02P 4/00; H02P 3/06; H02P 3/14; H02P 3/18; H02M 1/083; H05B 39/085
See application file for complete search history.

(56) References Cited

U.S. PATENT DOCUMENTS

| | | |
|---|---|---|
| 5,119,014 A | 6/1992 | Kronberg |
| 9,095,023 B2 | 7/2015 | Deppe et al. |
| 2013/0039104 A1* | 2/2013 | Sharma .................. H02M 1/10 363/123 |

FOREIGN PATENT DOCUMENTS

WO    WO 2014/135875 A1    9/2014

* cited by examiner

*Primary Examiner* — Monica C King
(74) *Attorney, Agent, or Firm* — Albert W. Watkins

(57) ABSTRACT

A solid state lighting panel sequentially energizes a plurality of LED lighting banks at the zero crossing points of the sinusoidal input line voltage. Each LED lighting bank is provided with a soft start circuit to ramp up the luminous intensity gradually. The energizing of one LED lighting bank at a time at zero cross, in combination with soft start ramp, keeps inrush spikes below the ultimate steady state operating current level. The lighting panel is further provided with line-in and line-out surge protection, along with a specific arrangement of terminals within a terminal block, the provision of surge protectors therein, the use of optically isolated solid state relays, and a plurality of well-placed circuit breakers to provide enhanced surge tolerance.

19 Claims, 6 Drawing Sheets

SOLID STATE LIGHTING PANEL

CROSS REFERENCE TO RELATED APPLICATIONS

The present application claims the benefit of U.S. provisional patent application 62/387,967 filed Jan. 11, 2016 of like title and inventorship, and also claims the benefit of U.S. provisional patent application 62/386,494 filed Dec. 3, 2015 of like inventorship, the teachings and entire contents of each which are incorporated herein by reference.

BACKGROUND OF THE INVENTION

1. Field of the Invention

The present invention is directed generally to industrial and commercial lighting control panels, and more particularly to solid state lighting panels such as are commonly mounted in cabinets and that are capable of sequentially energizing a plurality of LED lighting panels at the zero crossing points of the sinusoidal input line voltage and ramping up luminous intensity within each panel or group of co-powered panels.

2. Description of the Related Art

Lighting panels are a common device found in every mid to large scale community across the United States. In many cases, a single lighting panel may be configured to energize dozens if not hundreds of individual lighting devices. If these lighting devices are energized simultaneously, this may cause a sudden spike of so-called "inrush current" which may be harmful not only to the panel but also to the upstream power line source and the downstream lighting devices as well.

Inrush current is generally a momentary current surge in an electrical device occurring when the power control device is first activated. The term is also sometimes used to refer to the maximum, instantaneous input current drawn by an electrical device when first turned on. Although inrush current typically reduces to a lower steady-state device current during continued normal device operation, the effect of significant inrush current can be highly detrimental to downstream components. For example, inrush currents can generate undesirable EMI/RFI, damage device components, lower supply voltage available to other circuits, decrease power efficiency, cause system errors, make devices difficult to control, and complicate device design. For example, if the input power source for a device is current limited or has poor load regulation, large inrush currents can cause the input voltage to drop significantly, thereby affecting overall device operation.

In addition to downstream devices and apparatus being adversely affected, the upstream power line source may also be adversely affected. Large and sudden increases in load may reduce the voltage across an entire power line or power distribution circuit. Furthermore, when this type of load occurs simultaneously in many areas, such as when darkness sets in and street lights are turned on around an entire region, even the power plant may find it difficult to maintain both proper frequency and voltage on the AC power lines.

Recognizing the detrimental effects of sudden power demands such as are brought about by excessive inrush current upon start up of electrical devices and apparatus, many utilities set electrical rates based upon peak current draw. Within the service areas of these utility companies, if inrush current causes a spike in power draw the utility customer may be subjected to electric rates that are far higher than other comparable utility customers will pay.

While many devices are subject to problematic inrush currents, some types of motors, many types of traditional lighting, power converters, and power supplies often have particularly elevated inrush currents. Recognizing a need in the marketplace, several artisans have designed devices and apparatus that can reduce the amount of inrush current drawn by various other devices. Exemplary U.S. and Foreign patents and published applications, the teachings which are incorporated herein by reference, include: U.S. Pat. No. 5,119,014 by Kronberg, entitled "Sequential power-up circuit"; U.S. Pat. No. 9,095,023 by Deppe et al, entitled "LED retrofit lamp"; and WO 2014/135875 by Giles, entitled "Dimmer switches suitable for LED lamps". For example, Kronberg describes sequential initiation of devices to reduce peak inrush current. It is a subject of the present invention to alleviate this problematic inrush current-effect.

In addition to the foregoing patents, Webster's New Universal Unabridged Dictionary, Second Edition copyright 1983, is incorporated herein by reference in entirety for the definitions of words and terms used herein.

OBJECTS OF THE INVENTION

Exemplary embodiments of the present invention solve inadequacies of the prior art by providing a solid state lighting panel comprising a programmable logic circuit in electrical communication with a plurality of solid state relay devices. The output of the solid state relay devices are in electrical communication with a plurality of solid state lighting devices. The programmable logic circuit is programmed to sequentially energize the solid state relay devices, which in turn at the next zero crossing point of the sinusoidal input line voltage to the lighting panel, energizes the solid state lighting devices.

The present invention and the preferred and alternative embodiments have been developed with a number of objectives in mind. While not all of these objectives are found in every embodiment, these objectives nevertheless provide a sense of the general intent and the many possible benefits that are available from embodiments of the present invention.

A first object of the invention is to provide a solid state lighting panel that will maximize the longevity of street and other commercial, governmental, industrial, and like large installations of LED lighting fixture components. A second object of the invention is to reduce the surge loading of the power grid, and peak current drawn by an LED lighting installation. Another object of the present invention is to reduce the amount of audible noise, electrical noise in the form of EMI/RFI, and the like produced by the solid state lighting panel. A further object of the invention is to achieve the aforementioned objectives by providing a combination of staggered imitation, zero-cross initiation, and soft start of LED light illumination. Yet another object of the present invention is to provide a solid state lighting panel having surge protection adequate to protect the solid state components within a street-side cabinet. Another object of the invention is to enable manual overrides in the event of failure of one or more of the automatic control devices.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment, the present invention provides a solid state lighting panel incorporating the ability to soft start and autonomously dim LED based lighting devices.

Figure 1:
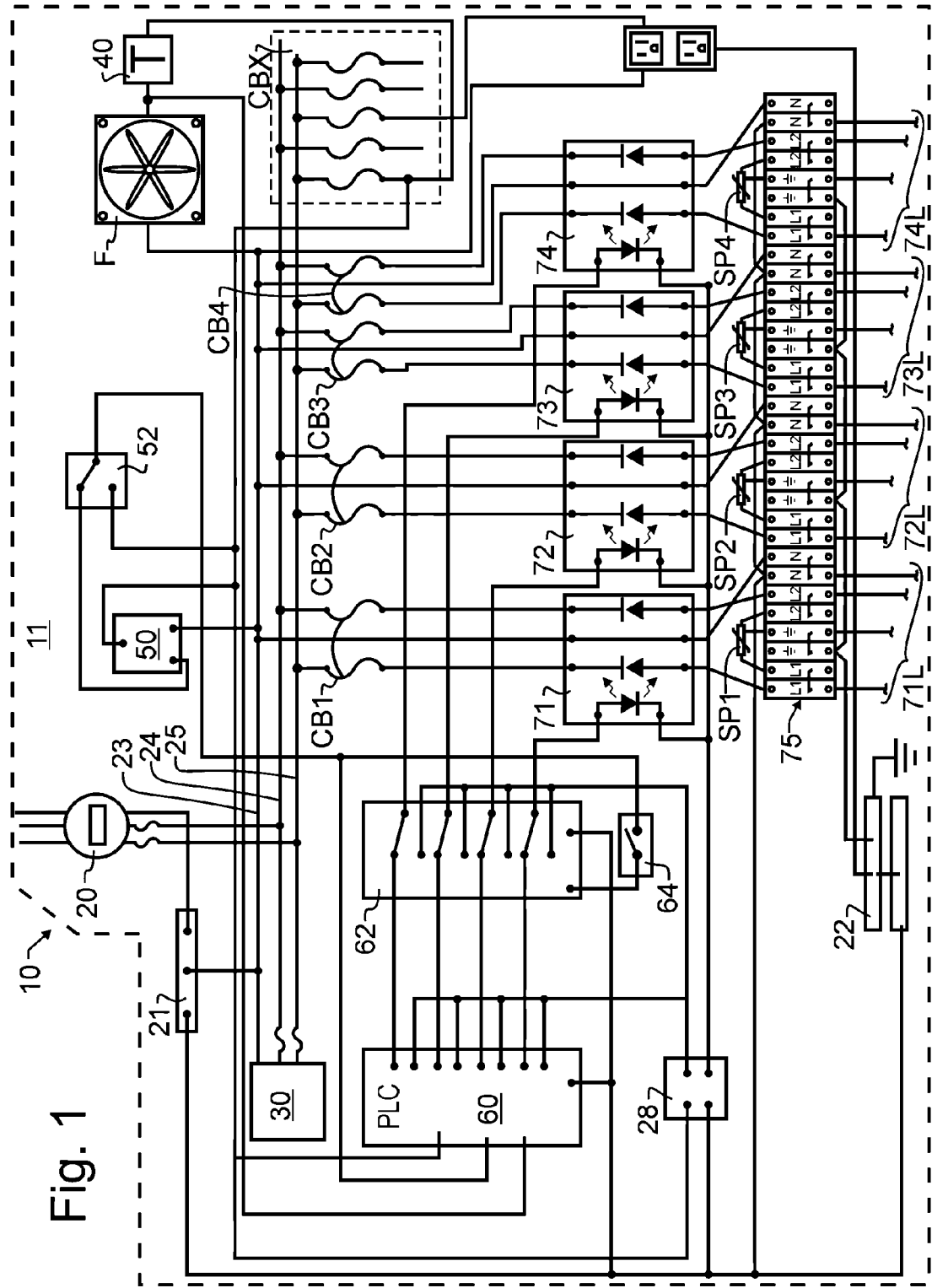
FIG. 1 illustrates a preferred embodiment solid state lighting panel designed in accord with the teachings of the present invention schematically.

A preferred embodiment solid state lighting panel 10 in accordance with the present invention is depicted schematically in FIG. 1. As illustrated, incoming AC line power 20 may include a pair of circuit breakers and an optional power meter, and may be connected to any suitable power line or other power source. The AC power line 20 will typically be a 240 VAC source as illustrated, though it will be understood herein that in alternative embodiments other voltages and other arrangements of power lines may be provided without deviating from the teachings of the present invention.

The incoming neutral line will be connected to neutral bus 21 and from there to neutral bus 22 and to neutral distribution line 23. Neutral bus 22 further provides connection to each of the neutral connections within the bank of terminals in terminal block 75. Hot line 2 is coupled through distribution line 24, and hot line 1 is likewise coupled through distribution line 25.

Surge protector device 30 prevents harmful voltage spikes that may be received from incoming AC line power 20, and will preferably be located as close as possible to the incoming AC line power 20 circuit breakers. Cabinet thermostat 40 and cabinet cooling fan F are coupled together across a 120 VAC branch, and the junction between the two is fed back to programmable logic circuit (PLC) 60. Manual operation switch 52 is optionally provided to control whether preferred embodiment solid state lighting panel 10 is energized responsive to photocell 50, or instead is directly energized. Activation of manual operation switch 52 may then be used for testing purposes, and as an override in the event of a failure of photocell 50.

The AC power line 20 is also coupled to a plurality of solid state relays 71 through 74, each which are protected by an associated one of circuit breakers CB1-CB4, respectively. PLC 60 may be in simultaneous electrical communication with solid state opto-isolator relays 71 through 74 through PLC bypass relay 62, and the outputs of the individual solid state opto-isolator relays 71-74 are coupled directly through terminal block 75 to one or a plurality of loads 71L-74L.

PLC bypass relay 62 is provided to enable fail-safe operation of preferred embodiment solid state lighting panel 10 in the event of a PLC failure. PLC bypass relay 62 determines whether preferred embodiment solid state lighting panel 10 is controlled by PLC 60, or instead solely by photocell 50. However, control by PLC 60 is most preferred, since PLC 60 provides preferred staggered initialization and other control functions, as will be described herein below.

Power for PLC 60, PLC bypass relay 62, and the light sources within each of solid state opto-isolator relays 71-74 is provided by 24 VDC power supply 28. However, as may be determined by the illustration, 24 VDC power supply 28 is not coupled directly to either distribution line 24 or distribution line 25, and instead distribution line 25 passes through a circuit breaker within the non-photo-contactor circuits of circuit breaker exchange CBX prior to reaching 24 VDC power supply 28.

In preferred embodiment solid state lighting panel 10, programmable logic circuit 60 is pre-programmed to sequentially turn on and off solid state opto-isolator relays 71 through 74 in response to either an activation (or lack thereof) signal received from photocell 50 or a manual command. In a preferred embodiment of the present invention, the sequential timing interval between activating individual solid state opto-isolator relays 71-74 may be approximately 5 seconds.

In one embodiment of the invention, once an individual solid state relay, for example solid state opto-isolator relay 71, receives an activation signal from programmable logic circuit 60, the internal circuitry of solid state opto-isolator relay 71 is designed such that at the next zero crossing of the incoming AC power sinusoidal signal, solid state opto-isolator relay 71 will couple power from each of the hot distribution line 24 and hot distribution line 25 though to terminal block 75, and from there out to the associated power load, in the case of relay 71 to power load 71L. In an alternative embodiment, PLC 60 is configured through internal programming to time the trigger signal to correspond to a zero-crossing of the incoming AC line power 20.

Note that neutral distribution line 23 as illustrated is always coupled to terminal block 75. Power load 71L may represent in one embodiment of the present invention a plurality of outdoor lighting devices distributed along city streets or highways. In the preferred embodiment, approximately 5 seconds after PLC 60 triggers solid state opto-isolator relay 71, programmable logic circuit 60 will output an activation signal to solid state opto-isolator relay 72. As before, at the next zero crossing of the incoming AC power sinusoidal signal, solid state opto-isolator relay 72 will couple power from each of the hot distribution line 24 and hot distribution line 25 though to terminal block 75, and from there out to the associated power load 72L. This sequence is configured through programming of PLC 60 to repeat every five seconds until all of the loads illustrated, 71L through 74L, are energized.

While the timing delay between energizing sequential loads is described as being at five second intervals, the particular amount of delay may be determined by a designer to suit a particular need or design constraint. Further, the present invention contemplates additional embodiments wherein preferred embodiment solid state lighting panel 10 may contain multiple programmable logic circuits 60, and each PLC may be in electrical communication with more loads such as LED lighting banks than depicted in FIG. 1. In these embodiments wherein the loads are sequentially energized, there is less instantaneous power and current drain on the AC power source as well as less electrical stress on internal components comprising preferred embodiment solid state lighting panel 10 and the LED lighting banks, thereby potentially increasing the working life of the entire system without repairs. In addition, while preferred embodiment solid state lighting panel 10 incorporates solid state opto-isolator relays 71-74, which are preferred owing to the additional protection afforded by the optical isolation between low voltage components and the AC relays being controlled, and for the silent operation provided by solid state relays, it will be appreciated that in alternative embodiments other types of relays may be used, including but not limited to solid state relays without optical isolation, and electromagnetic relays.

The specific arrangement of terminals within terminal block 75, the provision of surge protectors SP1-SP4 therein, the use of optically isolated solid state relays, and the provision of surge protector 30 all provide careful protection against surges that may arise externally to preferred embodiment solid state lighting panel 10. Preferred embodiment solid state lighting panel 10 in most instances will further be encased in some type of cabinet or box, which is most commonly fabricated from a metal conductive material such as steel or aluminum. With proper grounding of the cabinet, the likelihood of damage from surges, Electro-Static Discharge (ESD), or other potentially harmful voltage spikes is greatly reduced.

In addition to the control described herein above, PLC 60 may also be configured to control the outputs in other specialized ways, including for exemplary and non-limiting purposes be set up for special timing functions such as turning decoration lights on and off at certain times of the day or providing various outputs utilizing special input devices. PLC 60 may also provide a running total of the number of hours systems have operated.

Figure 2:
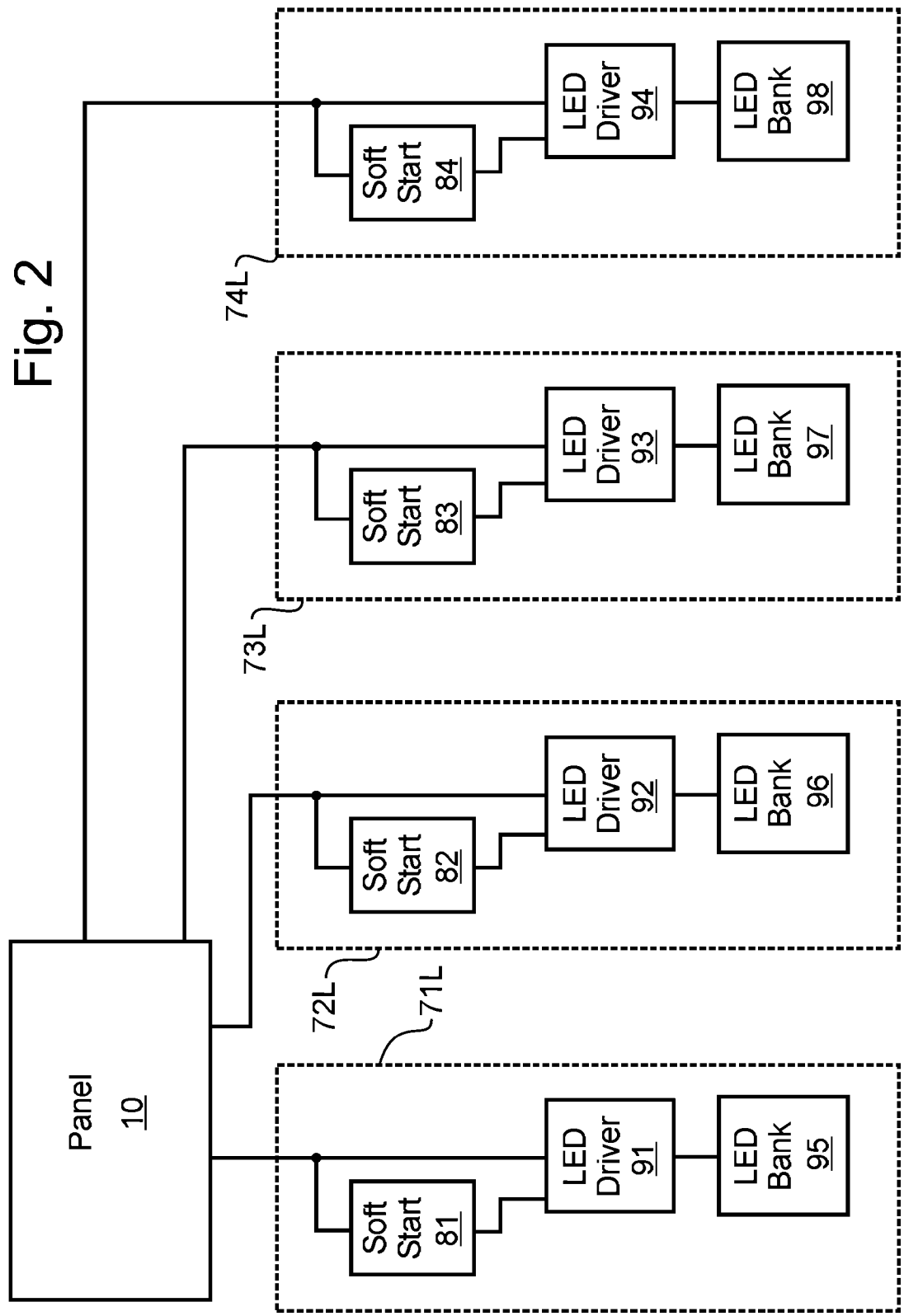
FIG. 2 illustrates the preferred embodiment solid state lighting panel of FIG. 1 in further combination with a plurality of soft start LED light banks.

FIG. 2 illustrates the arrangement of preferred embodiment solid state lighting panel 10 in combination with four illustrated power loads 71L-74L. Power load 71L comprises an LED driver 91 that is coupled directly to terminal block 75. Soft start circuitry 81 is likewise coupled directly to terminal block 75, but also provides a dimming control signal to LED driver 91. This dimming control signal will most preferably have a waveform in the geometry of a rising linear ramp. The ramp up may be configured to take any number of seconds, though in a typical installation this ramp-up may correspond approximately to the time that PLC 60 is programmed to take between the initiation of each sequential power load 71 through 74. Consequently, using the five second interval described herein above, then soft start circuitry 81 will in the preferred embodiment require approximately five seconds to allow LED driver 91 to reach full power output to LED bank 95. One example of soft start circuitry that gradually increases the illumination intensity of an LED light bank is provided in my U.S. provisional patent application 62/386,494 filed Dec. 3, 2015 of like inventorship, the teachings and entire contents which are incorporated herein above by reference, and in my utility patent application entitled "Soft Start Circuitry for LED Lighting Devices with Simultaneous Dimming Capability" co-pending herewith and filed on Dec. 5, 2016, the teachings and content which are incorporated by reference herein. However, any suitable circuitry that provides this gradual increase in illumination intensity will be understood to be applicable in alternative embodiments of the present invention.

Each power load is illustrated as having like components, though this is not necessary or essential. For exemplary purposes, each LED bank 95-98 may have a different number of LED lights. Furthermore, while soft start 81 is illustrated in FIG. 2 as comprising a separate device from LED driver 91, it will be recognized that, when so desired, this circuitry may be integrated directly into LED drivers 91-94, thereby eliminating the need for separate and discrete soft start circuits 81-84.

Figure 3:
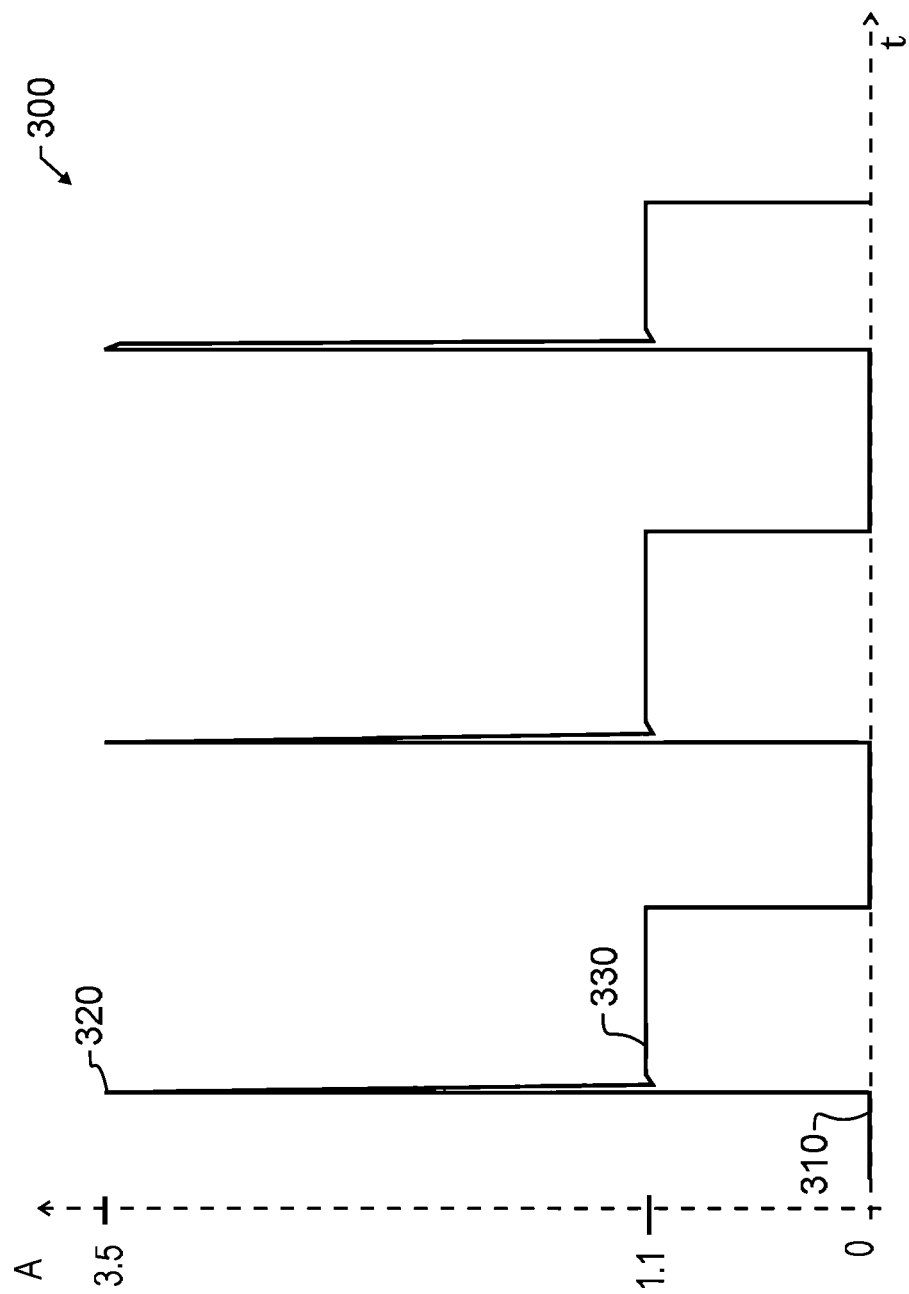
FIG. 3 depicts graphically the results of testing the inrush current for a magnetic contactor power supply without a soft start circuit device attached thereto.

FIG. 3 graphically illustrates testing the inrush current for a prior art magnetic contactor power supply without a soft start circuit device attached thereto. There is an impulse-like transition from an off state at 310 drawing no current to an instantaneous 3.5 amp peak inrush of current at 320, followed closely by an approximate 1.1 amp steady draw on the power supply at 330 in a square wave type fashion. This inrush is repeated over multiple on/off cycles with similar results. As may be appreciated, this is detrimental as illustrated, but the problem will be amplified many times over in the case of larger commercial, governmental, and industrial installations that utilize many banks of lights.

Figure 4:
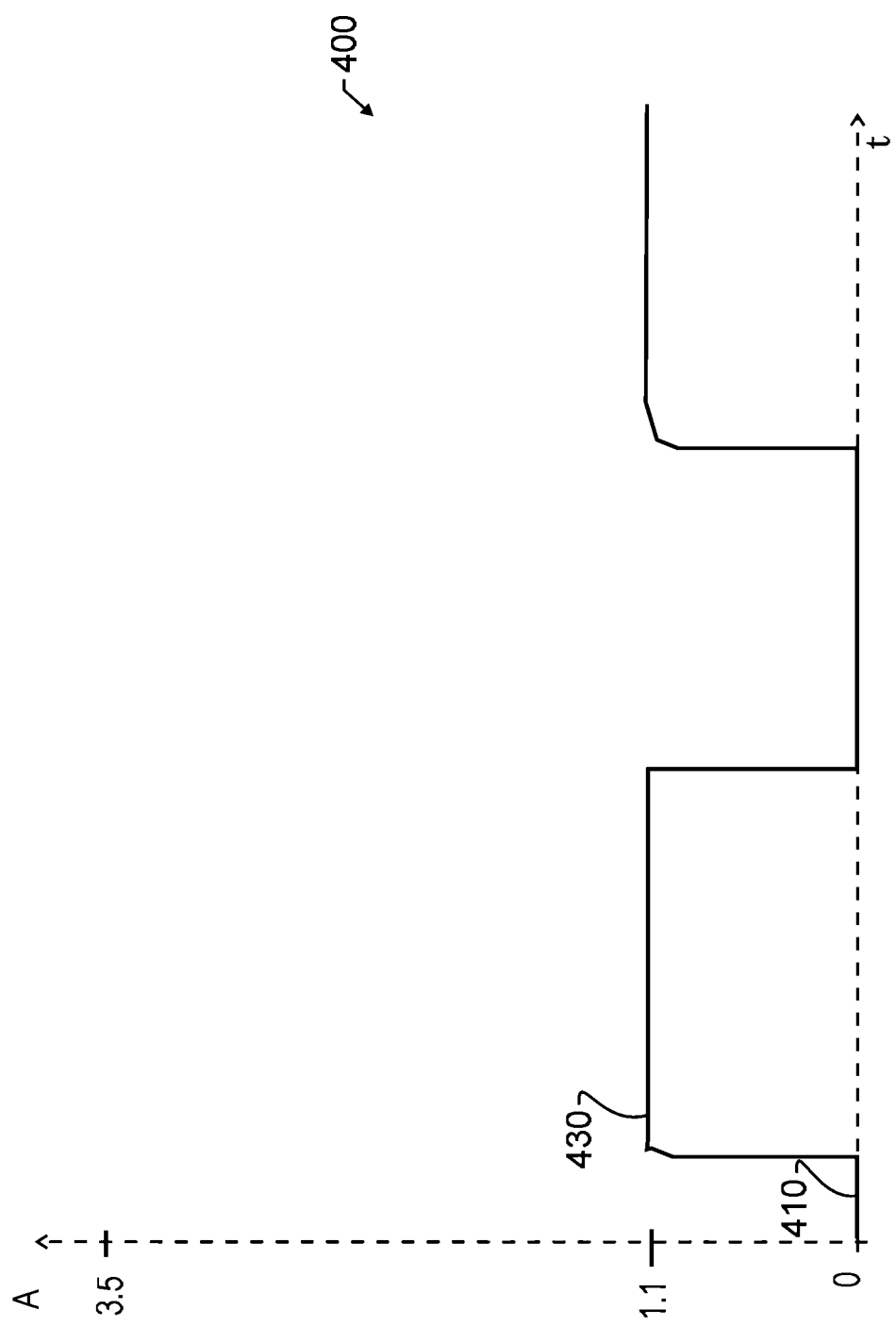
FIGS. 4 and 5 depict graphically the results of testing the inrush current for a zero crossing type power supply both without (FIG. 4) and with (FIG. 5) a soft start circuit device of FIG. 2 attached thereto.
Figure 5:
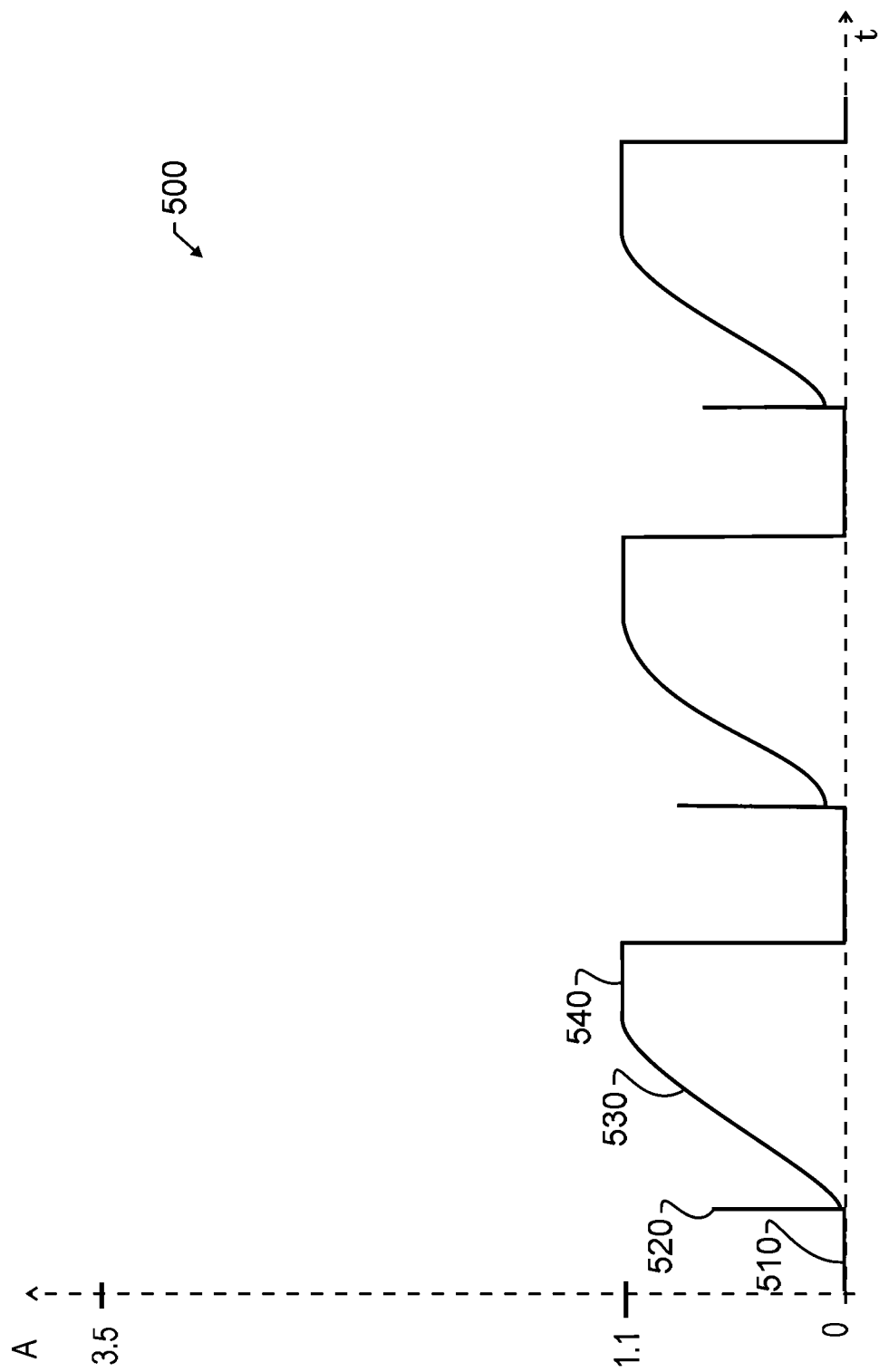

FIG. 4 shows the results of powering on and off a prior art zero crossing type power supply without a soft start circuit device 81-84 attached. Reflecting the benefit of a zero crossing power supply, FIG. 4 avoids the instantaneous 3.5 amp inrush of current, and instead rises directly to the approximate 1.16 amp steady draw 430 on the power supply in a square wave type fashion. This is repeated over multiple on/off cycles with similar results. In contrast to this, FIG. 5 shows the same zero crossing power supply with a preferred embodiment soft start circuit device 81 attached. FIG. 5 shows an instantaneous 0.6 amp inrush current draw 520 consistent with capacitor charging and the like. Of note here is that even the inrush current draw 520 is of lower amplitude than that of the steady operation state 540. Also shown in FIG. 5, the current draw on the power supply shows a somewhat linear ramp 530 spread over approximately 30 seconds ultimately to the same steady state current of approximately 1.16 amps. In this configuration, the RMS average current supplied by the power supply during charging ramp 530 is approximately 0.11 amps, representing a 91% reduction in the average current supplied by the power supply during the time duration ramp 530 requires to bring the LED lighting device to maximum/steady state light output.

Figure 6:
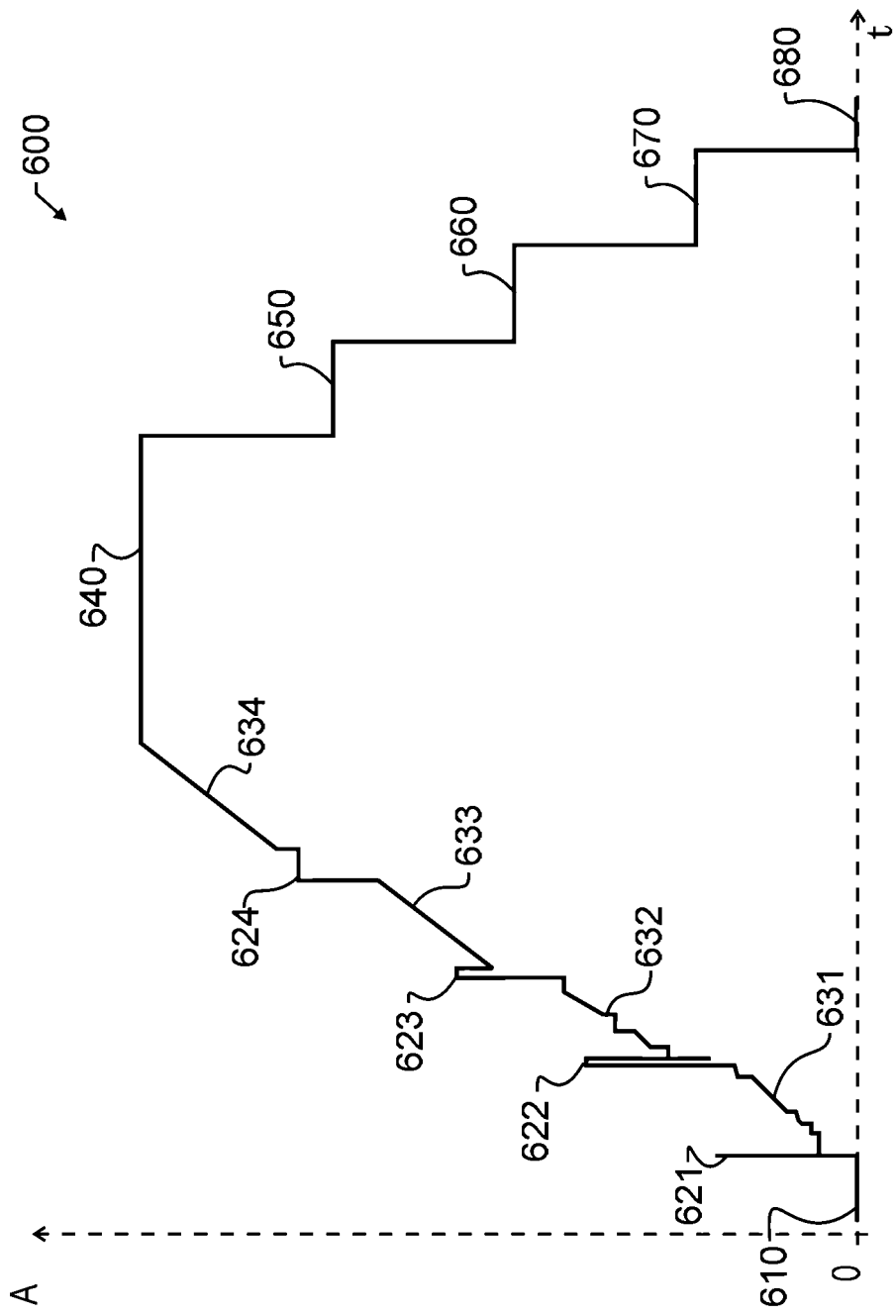
FIG. 6 depicts graphically the results of testing the inrush current for the preferred embodiment combination solid state lighting panel and plurality of soft start LED light banks of FIG. 2.

FIG. 6 depicts graphically the inrush current for the preferred embodiment combination solid state lighting panel and plurality of soft start LED light banks of FIG. 2. Four different solid state relays were triggered in five second intervals. The light fixtures were also equipped with soft start modules to create a ramping affect to the incoming electrical current. Prior to starting the sequential energization of solid state opto-isolator relays 71-74, the current 610 drawn by the preferred embodiment combination is only that required to operate the nominal circuitry such as 24 VDC power supply 28, PLC 60 and fan F. When the first solid state opto-isolator relay 71 is energized, this leads to the inrush current spike 621, which is followed by gradual ramp up 631 as LED light bank 95 is increased in luminous intensity. When second solid state opto-isolator relay 72 is energized, there is a similar inrush 622, followed by a similar gradual ramp up 632. This sequence repeats for the subsequent sequential energizations of solid state opto-isolator relay 73, leading to inrush peak 623 and ramp up 633, and energization of solid state opto-isolator relay 74, leading to inrush peak 624 and ramp up 634. When all of the power loads 71L-74L have reached steady operational state, the current draw will level as shown at 640. At some indeterminate time later, such as when the sun rises in the morning, PLC 60 will preferably be programmed to also sequentially disconnect power from each of power loads 71L-74L. This results in the steps 650, 660, 670, and 680, each which represent one fewer power load than the immediately preceding step.

As may be apparent, the present preferred embodiment combination solid state lighting panel and plurality of soft start LED light banks provides enhanced life to the LED light banks 95-98, by using zero-crossing switches to reduce the inrush magnitude, gradually increasing the luminous intensity within each bank. On a larger scale, the use of the present preferred embodiment combination solid state lighting panel and plurality of soft start LED light banks may additionally protect power generating stations. Consider a large city with hundreds of outdoor LED based lighting devices on a common grid that all get simultaneously energized at once, for example at dusk for night time lighting. The combined simultaneous inrush of current to the individual lighting devices may stress/damage individual components at the generator station or overheat the wiring leading to the lighting devices. This extreme inrush load of the prior art forces the utility company to provide heavier power line wires and to overbuild the generating capacity to withstand large surges in demand. In contrast, and as well illustrated in FIG. 6, the preferred embodiment never exceeds steady-state draw 640 during start-up, and the magnitude of the inrush impulses 621-624 is minor compared to the prior art. Since the inrush impulses 621-624 are of much lower magnitude, this also means that there will be much lower EMI/RFI noise generated by this inrush.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a solid state lighting panel and a plurality of soft start LED light banks, comprising:
   an incoming AC line power connection;
   a plurality of solid state lighting devices within said plurality of soft start LED light banks;
   soft start circuitry coupled with and configured to gradually increase the luminous intensity of at least one of said plurality of solid state lighting devices upon an initiation;
   a plurality of electrical relay devices electrically coupled to said incoming AC line power connection, individual ones of said plurality of electrical relay devices operative to selectively couple and uncouple said incoming AC line power line connection to respective individual ones of said plurality of solid state lighting devices; and
   a programmable logic circuit in electrical communication with said plurality of electrical relay devices and configured to sequentially energize said individual ones of said plurality of electrical relay devices and thereby selectively couple said incoming AC line power line connection to respective individual ones of said plurality of solid state lighting devices in synchronization with a zero crossing point of the sinusoidal input line voltage, to thereby initiate said at least one of said plurality of solid state lighting devices.

2. The combination solid state lighting panel and plurality of soft start LED light banks of claim 1, wherein said programmable logic circuit is configured to time said sequential energizations to correspond to a zero-crossing of the incoming AC line power.

3. The combination solid state lighting panel and plurality of soft start LED light banks of claim 1, wherein said plurality of electrical relay devices are configured to switch exclusively at said zero crossing.

4. The combination solid state lighting panel and plurality of soft start LED light banks of claim 1, wherein said plurality of electrical relay devices further comprise solid state relays.

5. The combination solid state lighting panel and plurality of soft start LED light banks of claim 4, wherein said solid state relays further comprise solid state opto-isolator relays.

6. The combination solid state lighting panel and plurality of soft start LED light banks of claim 1, further comprising a surge protector device configured to suppress voltage spikes received from said incoming AC line power connection.

7. The combination solid state lighting panel and plurality of soft start LED light banks of claim 1, further comprising:
   an LED driver coupled with said incoming AC line power connection through said plurality of electrical relay devices and providing an LED power supply output;
   wherein said soft start circuitry is coupled with said incoming AC line power connection through said plurality of electrical relay devices and further comprises a dimming control signal output coupled to an input of said LED driver.

8. The combination solid state lighting panel and plurality of soft start LED light banks of claim 1, wherein said dimming control signal output further comprises a rising linear ramp waveform.

9. The combination solid state lighting panel and plurality of soft start LED light banks of claim 1, further comprising:
   an LED driver coupled with said incoming AC line power connection through said plurality of electrical relay devices and providing an LED power supply output;
   wherein said soft start circuitry is integrated directly into said LED driver.

10. The combination solid state lighting panel and plurality of soft start LED light banks of claim 1, further comprising:
    a photocell; and
    a manual operation switch in electrical communication with said programmable logic circuit and having a first switch position configured to cause said programmable logic circuit to sequentially energize said individual ones of said plurality of electrical relay devices responsive to said photocell, and having a second switch position different from said first switch position configured to cause said programmable logic circuit to sequentially energize said individual ones of said plurality of electrical relay devices responsive to a switching of said manual operations switch to said second switch position.

11. The combination solid state lighting panel and plurality of soft start LED light banks of claim 1, further comprising a PLC bypass relay configured in a first state to enable said programmable logic circuit to sequentially energize said individual ones of said plurality of electrical relay devices and in a second state to bypass said programmable logic circuit.

12. The combination solid state lighting panel and plurality of soft start LED light banks of claim 10, wherein said programmable logic circuit is configured to turn on and off said plurality of electrical relay devices in response to an activation signal received from at least one of said photocell and said manual operation switch.

13. The combination solid state lighting panel and plurality of soft start LED light banks of claim 6, further comprising:
- a terminal block having at least one terminal defining an output from said solid state lighting panel and having a specific arrangement of terminals alternating between hot lines and neutral or ground lines; and
- at least one surge protector coupled to at least one terminal within said terminal block;
- wherein said plurality of electrical relay devices further comprise solid state opto-isolator relays.

14. The combination solid state lighting panel and plurality of soft start LED light banks of claim 13, further comprising a grounded conductive metal cabinet.

15. The combination solid state lighting panel and plurality of soft start LED light banks of claim 1, wherein individual energizations of said sequential energizations are repeated at intervals approximately equal to a time interval required for said soft start circuitry to complete said gradual increase of said luminous intensity.

16. The combination solid state lighting panel and plurality of soft start LED light banks of claim 1 further comprising a photocell in electrical communication with the input to the programmable logic circuit.

17. The combination solid state lighting panel and plurality of soft start LED light banks of claim 16 wherein when energized by day light said photocell output signal may deactivate the output signal of the programmable logic circuit, thereby turning off said electrical relay devices.

18. The combination solid state lighting panel and plurality of soft start LED light banks of claim 17 wherein said programmable logic circuit is configured to sequentially turn off said electrical relay devices when receiving a signal from said photocell.

19. The combination solid state lighting panel and plurality of soft start LED light banks of claim 1 further comprising a thermostat in electrical communication with a cooling fan.

* * * * *